United States Patent
Larsen et al.

(10) Patent No.: US 8,000,856 B2
(45) Date of Patent: Aug. 16, 2011

(54) FUEL DOOR SENSOR DIAGNOSTIC SYSTEMS AND METHODS

(75) Inventors: John F. Larsen, Campbellcroft (CA); Zhong Wang, Bellevue, WA (US); Michael Pickett, Ajax (CA); Lan Wang, Troy, MI (US); Richard E. Parsons, Jr., Grand Blanc, MI (US)

(73) Assignee: GM Global Technology Operations LLC

(*) Notice: Subject to any disclaimer, the term of this patent is extended or adjusted under 35 U.S.C. 154(b) by 357 days.

(21) Appl. No.: 12/351,247

(22) Filed: Jan. 9, 2009

(65) Prior Publication Data

US 2009/0216400 A1 Aug. 27, 2009

Related U.S. Application Data

(60) Provisional application No. 61/030,603, filed on Feb. 22, 2008.

(51) Int. Cl.
 *G01M 17/00* (2006.01)
 *G06F 7/00* (2006.01)

(52) U.S. Cl. .............. 701/34; 701/29; 701/31; 701/49

(58) Field of Classification Search ............... 220/4.14; 340/438

See application file for complete search history.

(56) References Cited

U.S. PATENT DOCUMENTS

| | | | | |
|---|---|---|---|---|
| 4,827,415 A * | 5/1989 | Gudat et al. | ..................... | 701/49 |
| 4,926,332 A * | 5/1990 | Komuro et al. | ................. | 701/36 |
| 5,828,302 A * | 10/1998 | Tsutsumi et al. | ............. | 340/540 |
| 7,058,490 B2 * | 6/2006 | Kim | ................. | 701/34 |
| 7,634,347 B2 * | 12/2009 | Hill et al. | ...................... | 701/102 |
| 7,671,482 B2 * | 3/2010 | Tighe | ............................. | 307/9.1 |
| 2005/0022584 A1 * | 2/2005 | De Ronne et al. | ............. | 73/49.7 |
| 2006/0190148 A1 * | 8/2006 | Grenn | ............................ | 701/29 |

* cited by examiner

*Primary Examiner* — Khoi Tran
*Assistant Examiner* — Bao Long Nguyen

(57) ABSTRACT

A diagnostic system for a vehicle comprises a refueling indicator module and a diagnostic module. The refueling indicator module selectively indicates when a refueling event occurs. The diagnostic module selectively diagnoses a fault in a fuel door position sensor when the fuel door position sensor indicates that a fuel door is in one of an open position for less than a first predetermined period when the refueling event occurs and a closed position for greater than a second predetermined period when the refueling event occurs.

16 Claims, 3 Drawing Sheets

FUEL DOOR SENSOR DIAGNOSTIC SYSTEMS AND METHODS

CROSS-REFERENCE TO RELATED APPLICATIONS

This application claims the benefit of U.S. Provisional Application No. 61/030,603, filed on Feb. 22, 2008. The disclosure of the above application is incorporated herein by reference in its entirety.

FIELD

The present disclosure relates to fuel systems and more particularly to fuel door position sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust a mixture of air and fuel to generate torque. The fuel of the air/fuel mixture may be liquid fuel and/or vapor fuel A fuel system is used to supply liquid fuel and/or vapor fuel to the engine. A fuel injector provides the engine with liquid fuel drawn from a fuel tank. A vapor purge system provides the engine with fuel vapor drawn from a vapor canister.

Generally, liquid fuel is contained within the fuel tank. In some circumstances, the liquid fuel may vaporize and form fuel vapor. The vapor canister stores the fuel vapor. The purge system also includes a purge valve and a vent valve (i.e., a diurnal valve). Operation of the engine causes a vacuum (low pressure relative to barometric pressure) to form within an intake manifold of the engine. Selective actuation of the purge valve and the vent valve then allows the fuel vapor to be drawn into the intake manifold via the low pressure, thereby purging the fuel vapor from the vapor canister.

SUMMARY

A diagnostic system for a vehicle comprises a refueling indicator module and a diagnostic module. The refueling indicator module selectively indicates when a refueling event occurs. The diagnostic module selectively diagnoses a fault in a fuel door position sensor when the fuel door position sensor indicates that a fuel door is in one of an open position for less than a first predetermined period when the refueling event occurs and a closed position for greater than a second predetermined period when the refueling event occurs.

In other features, a plug-in hybrid vehicle system comprises the diagnostic system and the fuel door position sensor.

In still other features, the first predetermined period varies based on a refueling amount of the refueling event.

In further features, the refueling indicator module selectively indicates that the refueling event occurs when a fuel level increase is greater than a predetermined amount.

In still features, the refueling indicator module selectively indicates that the refueling event occurs when a tank pressure is less than a predetermined pressure after the fuel level increase.

In other features, the refueling indicator module indicates that the refueling event occurs when a vehicle speed is zero.

In still other features, the second predetermined period is greater than the first predetermined period.

A diagnostic method comprises selectively indicating when a refueling event occurs and selectively diagnosing a fault in a fuel door position sensor when the fuel door position sensor indicates that a fuel door is in one of an open position for less than a first predetermined period when the refueling event occurs and a closed position for greater than a second predetermined period when the refueling event occurs.

In other features, a method comprises implementing the diagnostic method in a plug-in hybrid vehicle system.

In still other features, the diagnostic method further comprises varying the first predetermined period based on a refueling amount of the refueling event.

In further features, the selectively indicating comprises selectively indicating that the refueling event occurs when a fuel level increase is greater than a predetermined amount.

In still further features, the selectively indicating comprises selectively indicating that the refueling event occurs when a tank pressure is less than a predetermined pressure after the fuel level increase.

In other features, the selectively indicating comprises indicating that the refueling event occurs when a vehicle speed is zero.

In still other features, the second predetermined period is greater than the first predetermined period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
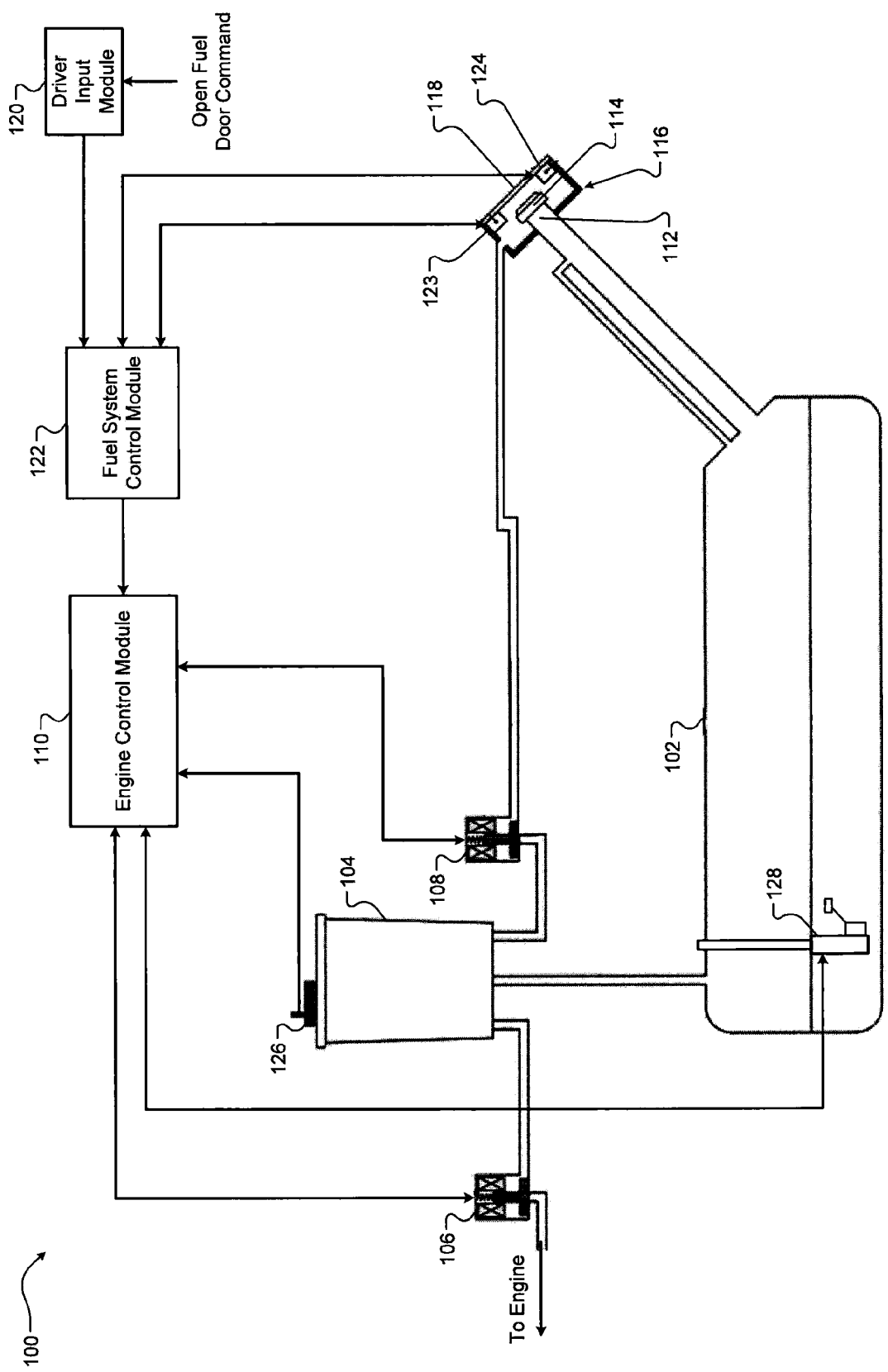
FIG. 1 is a functional block diagram of a fuel system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A vehicle includes a fuel door opening device that opens a fuel door of the vehicle to an open position when commanded. A fuel door position sensor monitors and outputs the position of the fuel door. The present application relates to systems and methods for diagnosing a fault in the fuel door position sensor.

More specifically, the present application relates to systems and methods that selectively diagnose a fault in the fuel door position sensor when a refueling event occurs. For example, the present application relates to diagnosing a fault based on a period that the fuel door position sensor indicates that the fuel door is in an open position when a refueling event occurs. More specifically, a fault is diagnosed when the fuel door position sensor indicates that the fuel door was in the open position for a period that is less than a predetermined period when a refueling event occurs. A fault is also diagnosed when the fuel door position sensor indicates that the fuel door was in a closed position for greater than a second predetermined period when a refueling event occurs.

Referring now to FIG. 1, a functional block diagram of an exemplary fuel system 100 is presented. Generally, a vehicle includes an internal combustion engine that generates torque. For example only, the engine may be a gasoline-type engine, a diesel-type engine, and/or another suitable type of engine. The engine combusts a mixture of air and fuel within one or more cylinders of the engine to generate torque.

In some vehicles, torque generated by the engine may be used to propel the vehicle. In such vehicles, torque output by the engine is transferred to a transmission, which may then transfer torque to one or more wheels of the vehicle. In other vehicles, such as hybrid vehicles, torque output by the engine is not transferred to the transmission. Instead, torque output by the engine is converted into electrical energy by, for example, a generator or a belt alternator starter (BAS). The electrical energy may be then provided to an electric motor and/or an energy storage device. The electric motor uses electrical energy to generate torque to propel the vehicle. Some hybrid vehicles may also receive electrical energy from an alternating current (AC) power source, such as a standard wall outlet. Such hybrid vehicles are referred to as plug-in hybrid vehicles.

The fuel system 100 supplies fuel to an engine, such as an engine of a plug-in hybrid vehicle or any other vehicle. More specifically, the fuel system 100 supplies liquid fuel and fuel vapor to the engine. While the operation of the fuel system 100 will be discussed as it relates to plug-in hybrid vehicles, the principles of the present disclosure are also applicable to other vehicles having an internal combustion engine.

The fuel system 100 includes a fuel tank 102 that contains liquid fuel. Some conditions, such as heat, vibration, and/or radiation, may cause liquid fuel contained within the fuel tank 102 to vaporize. A canister 104 traps and stores vaporized fuel (i.e., fuel vapor). For example only, the canister 104 may include one or more substances, such as a charcoal substance, which store fuel vapor.

Operation of the engine creates a vacuum within an intake manifold of the engine. A purge valve 106 and a vent valve 108 may be selectively operated (e.g., opened and closed) to draw fuel vapor from the canister 104 to the intake manifold for combustion. Operation of the purge valve 106 and the vent valve 108 may be coordinated to purge fuel vapor from the canister 104. An engine control module (ECM) 110 controls the operation of the purge valve 106 and the vent valve 108.

At a given time, the purge valve 106 and the vent valve 108 may each be in one of two positions: an open position and a closed position. For example, the ECM 110 may allow ambient air into the canister 104 by commanding the vent valve 108 to the open position. When the vent valve 108 is in the open position, the ECM 110 may command the purge valve 106 to the open position to purge fuel vapor from the canister 104 to the intake manifold. The ECM 110 also controls the rate at which fuel vapor is purged from the canister 104 (i.e., a purge rate) by adjusting how long the purge valve 106 is in the open position during a given period of time (i.e., a purge valve duty cycle).

The vacuum within the intake manifold draws fuel vapor from the canister 104 to the intake manifold via the purge valve 106. The purge rate may be determined based on the duty cycle of the purge valve 106 and the amount of fuel vapor within the canister 104. Air at ambient (i.e., barometric) pressure is drawn into the canister 104 via the vent valve 108.

The ECM 110 commands the vent valve 108 to the open position and controls the duty cycle of the purge valve 106 during operation of the engine. When the engine is shut down (e.g., key OFF), the ECM 110 commands both the purge valve 106 and the vent valve 108 to their respective closed positions. In this manner, except as discussed further below, the purge valve 106 and the vent valve 108 are maintained in their respective closed positions when the engine is OFF.

A driver of the vehicle may add liquid fuel to the fuel tank 102. Liquid fuel may be added to the fuel tank 102 via a fuel inlet 112. A fuel cap 114 closes the fuel inlet 112 and, therefore, the fuel tank 102. A driver of the vehicle may access the fuel cap 114 and the fuel inlet 112 via a fueling compartment 116. A fuel door 118 closes the fueling compartment 116. In various implementations, the ambient air provided to the canister 104 through the vent valve 108 may be drawn from the fueling compartment 116.

The driver may access the fueling compartment 116 by commanding the fuel door 118 to open. Accordingly, the driver commands opening of the fuel door 118 before adding liquid fuel to the fuel tank 102. For example only, the driver may press a button or toggle a switch to command the fuel door 118 to open. This command will be referred to as an open fuel door command.

A driver input module 120 receives the open fuel door command and communicates the command to a fuel system control module 122. The fuel system control module 122 commands an opening device 123 to open the fuel door 118 when the open fuel door command is received. For example only, the opening device 123 may include a solenoid and/or other devices that opens the fuel door 118 or allows the fuel door 118 to be opened after the open fuel door command is received.

The fuel system control module 122 also communicates the open fuel door command to the ECM 110. The ECM 110 then commands the vent valve 108 to its open position. Accordingly, the ECM 110 commands the vent valve 108 to its open position when the open fuel door command is received.

A vacuum naturally forms within the fuel tank 102 after the engine is shut down. This vacuum may be attributable to heating and subsequent cooling of gas (e.g., air and/or fuel vapor) present in the fuel tank 102 and/or the canister 104 after the engine is shut down. As stated above, however, the ECM 110 commands the vent valve 108 to the open position when the open fuel door command is received. Accordingly, vacuum that may be present in the fuel tank 102 is released when the driver commands the fuel door 118 to open. Consequently, the pressure of gas within the fuel tank 102 approaches the ambient air pressure.

The fuel system control module 122 may receive various other signals, such as a fuel door position signal from a fuel door position sensor 124. The fuel door position sensor 124 monitors whether the fuel door 118 is in a closed position or an open position and generates the fuel door position signal based on the position of the fuel door 118. The fuel system control module 122 may transmit one or more received signals, such as the fuel door position signal, to the ECM 110.

The ECM 110 may also receive various other signals. For example only, the ECM 110 receives a tank pressure signal from a tank pressure sensor 126 and a fuel level signal from a fuel level sensor 128. The tank pressure sensor 126 measures pressure of the gas (e.g., air and fuel vapor) within the fuel tank 102 (i.e., a tank pressure) and generates the tank pressure signal accordingly. For example only, the tank pressure may be measured relative to ambient air pressure. While the tank pressure sensor 126 is depicted as being located within the canister 104, the tank pressure sensor 126 may be located in other locations, such as within the fuel tank 102.

The fuel level sensor 128 measures the amount of liquid fuel in the fuel tank 102 (i.e., a fuel level) and generates the fuel level signal accordingly. The amount of liquid fuel in the fuel tank 102 may be in terms of a volume, a percentage of a maximum volume of the fuel tank 102, or another suitable measure of the amount of fuel in the fuel tank 102.

The ECM 110 may perform various functions based on the received signals. For example only, the ECM 110 may determine whether a component of the fuel system 100 leaks, perform various diagnostics for components of the fuel system 100, and/or perform other suitable functions. The ECM 110 may, however, selectively refrain from performing one or more of the functions based on the received signals. For example only, the ECM 110 may refrain from performing functions when the fuel door 118 is open.

Figure 2:
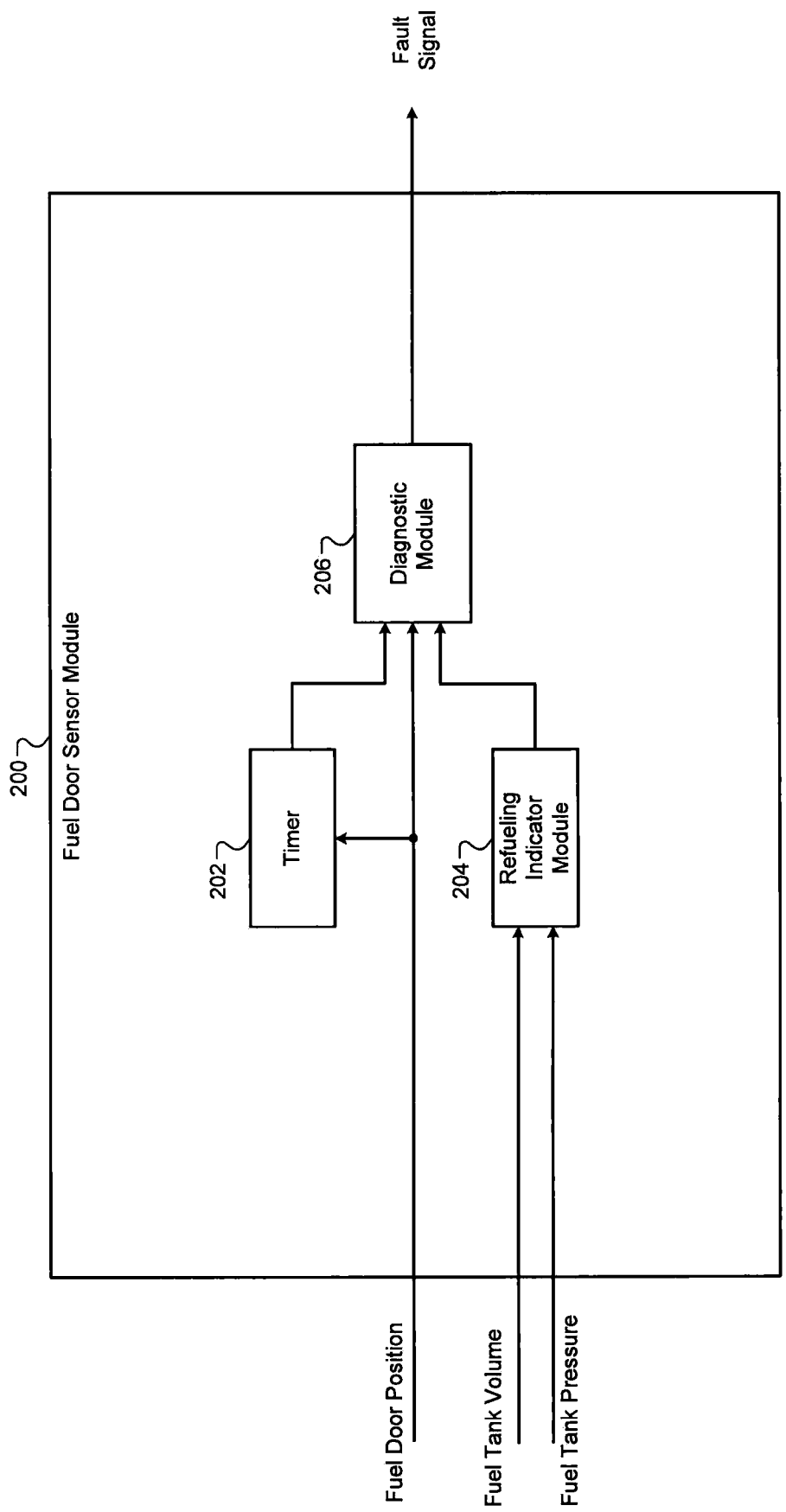
FIG. 2 is a functional block diagram of an exemplary implementation of a fuel door sensor module according to the principles of the present disclosure.

The ECM 110 includes a fuel door sensor module 200 (as shown in FIG. 2) that selectively diagnoses a fault in the fuel door position sensor 124. More specifically, the fuel door sensor module 200 selectively diagnoses a fault in the fuel door position sensor 124 when the fuel door position sensor 124 indicates that the fuel door 118 is open for less than a predetermined period when a refueling event occurs. The fuel door sensor module 200 also selectively diagnoses a fault in the fuel door position sensor 124 when the fuel door position sensor 124 indicates that the fuel door 118 is closed for greater than a second predetermined period when a refueling event occurs.

The ECM 110 may remain operational (i.e., not power down) and/or command one or more modules to remain operational for a period of time after the fuel door position sensor 124 indicates that the fuel door is open even after the vehicle is shut down. This period may be calibratable and may be set to allow the fuel door sensor module 200 time to detect occurrence of a refueling event.

While the fuel door sensor module 200 is discussed as being located within the ECM 110, the fuel door sensor module 200 may be located in other locations. For example only, the fuel door sensor module 200 may be located within the fuel system control module 122, another module within a plug-in hybrid vehicle system, and/or other modules in other types of vehicle systems.

Referring now to FIG. 2, a functional block diagram of an exemplary implementation of the fuel door sensor module 200 is presented. The fuel door sensor module 200 includes a timer 202, a refueling indicator module 204, and a diagnostic module 206. The timer 202 is activated when the fuel door position sensor 124 indicates that the fuel door 118 is open. The timer 202 tracks the period of time elapsed since the fuel door 118 was opened and may be referred to as an open door timer.

The timer 202 is deactivated when the fuel door position sensor 124 indicates that the fuel door 118 is closed. Additionally, the timer 202 may be reset after the fuel door 118 is in the closed position. For example only, the timer 202 may be reset to a predetermined reset value, such as 0.0. The fuel door sensor module 200 may also include a second timer (not shown) that tracks the period of time that the fuel door 118 is closed. This timer may be referred to as a closed door timer.

The refueling indicator module 204 determines whether a refueling event has occurred and generates a refueling indicator accordingly. The refueling indicator module 204 may determine whether a refueling event has occurred based on the tank pressure and the fuel level. For example only, a refueling event may have occurred when the fuel level increases by more than a predetermined amount over a period of time. The refueling indicator module 204 may also require that the vehicle be stopped for a refueling event to occur. For example only, the vehicle may be stopped when the vehicle speed is equal to zero. In various implementations, the vehicle speed may be determined based on the output speed of the transmission.

The refueling indicator module 204 may refrain from indicating that a refueling event has occurred when the tank pressure changes more than a predetermined amount over that period of time. As the ECM 110 commands the vent valve 108 to the open position when the fuel door 118 is opened, the tank pressure should be at or approaching the ambient air pressure when liquid fuel is added (i.e., when a refueling event begins).

Added liquid fuel then increases the fuel level while proportionally displacing gas via the open vent valve 108. Accordingly, the tank pressure should remain at or close to the ambient air pressure during a refueling event. A tank pressure increase (e.g., a high tank pressure) that occurs when the fuel level increases may be attributable to an event other than a refueling event. Such a tank pressure change may be attributable to, for example, parking the vehicle on a hill, towing the vehicle, and/or liquid fuel "sloshing" within the fuel tank 102 when the fuel system 100 is closed.

For example only, the refueling indicator module 204 may determine whether a refueling event has occurred using the relationship, Refueling Event occurred if: $FL_2-FL_1$>predetermined amount; vehicle speed=0; and
$|TP|$<predetermined pressure, (1)

where $FL_1$ is a first fuel level measured at a first time, $FL_2$ is a second fuel level measured at a second time, and TP is a tank pressure measured at the second time.

The first time may occur after passing of a predetermined period of time after the vehicle speed reaches zero. This predetermined period may be calibratable and may be set based on a time at which liquid fuel within the fuel tank 102 has likely stopped sloshing, such as approximately 20 seconds after the vehicle speed reaches zero. The second time occurs after the first time and may be, for example, 5.0 seconds after the first time. The refueling indicator module 204 may determine whether a refueling event has occurred after every predetermined period of time, for example, every 5.0 seconds, until the vehicle begins to move (e.g., vehicle speed>0.0).

The diagnostic module 206 selectively diagnoses occurrence of a fault in the fuel door position sensor 124 based on the refueling indicator and the position of the fuel door 118. More specifically, the diagnostic module 206 selectively diagnoses a fault in the fuel door position sensor 124 when a refueling event has occurred.

The diagnostic module 206 selectively diagnoses a fault in the fuel door position sensor 124 based on a period that the fuel door position sensor 124 indicates that the fuel door 118 was open before the refueling event. For example, the diagnostic module 206 may diagnose fault in the fuel door position sensor 124 based on the timer 202.

A refueling event may be accomplished in a minimum period of time. Accordingly, the diagnostic module 206 may diagnose a fault in the fuel door position sensor 124 when the timer 202 indicates that the fuel door 118 was in the open position for less than the minimum period. The minimum period of time may be calibratable and may be determined based on, for example, the fuel level increase. For example only, the minimum period of time may be approximately 20.0 s. The minimum period may be set based on a predetermined volume of fuel, such as 15.0 L of fuel. The diagnostic module 206 generates a fault signal based on the diagnosis, thereby indicating whether a fault has occurred in the fuel door position sensor 124.

The diagnostic module 206 may transmit the fault signal to the ECM 110, which may take remedial action when a fault has been diagnosed in the fuel door position sensor 124. For example only, the ECM 110 may illuminate a "check engine light" and/or set a flag in memory when a fault has been diagnosed.

Figure 3:
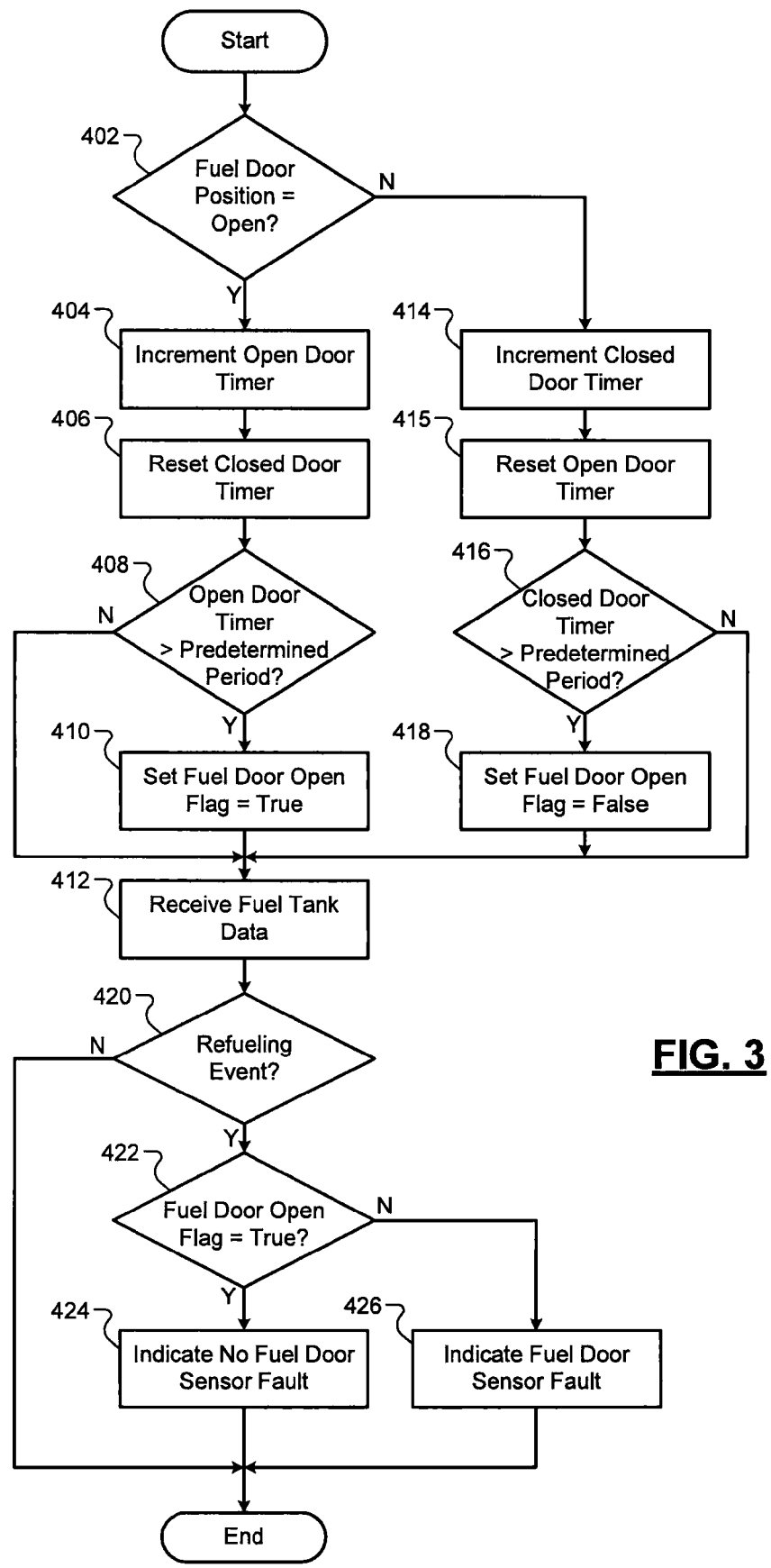
FIG. 3 is a flowchart depicting exemplary steps performed by the fuel door sensor module according to the principles of the present disclosure.

Referring now to FIG. 3, a flowchart depicting exemplary steps performed by the fuel door sensor module 200 is presented. Control begins in step 402 where control determines whether the fuel door 118 is in the open position. If true, control proceeds to step 404. If false, control transfers to step 414, which is discussed further below. In step 404, control increments the open door timer. Control continues in step 406 where control resets the closed door timer. The open and closed door timers track to the period that the fuel door 118 has been in the open and closed positions, respectively. The state of the fuel door open flag (i.e., true or false) corresponds to whether the open and closed door timers have reached respective predetermined periods. More specifically, the fuel door open flag will be true when the fuel door position sensor 124 has indicated that the fuel door 118 was open for the minimum predetermined period. The open door flag will be false when the fuel door position sensor 124 has indicated that the fuel door 118 was closed for a second predetermined period that is greater than the minimum predetermined period.

In step 408, control determines whether the open door timer is greater than the predetermined period (i.e., a first predetermined period). If true, control sets the fuel door open flag to true in step 410 and continues to step 412. If false, control transfers to step 412, which is discussed further below. In this manner, control sets the fuel door open flag to true when the fuel door sensor 124 has indicated that the fuel door 118 is open for the predetermined period.

Referring back to step 414 (i.e., when the fuel door 118 is closed), control increments the closed door timer. Control resets the open door timer in step 415 and continues to step 416. In step 416, control determines whether the closed door timer is greater than a predetermined period (i.e., a second predetermined period). If true, control continues to step 418 where control sets the fuel door open flag to false and continues to step 412. If false, control transfers to step 412. The predetermined period of step 416 may be calibratable.

Control receives fuel tank data in step 412, such as the fuel tank pressure and fuel level. In step 420, control determines whether a refueling event has occurred. If true, control continues to step 422. If false, control ends. Control determines whether the fuel door open flag is true in step 422. If true, control indicates that no fault is present in the fuel door position 124 sensor in step 424 and control ends. If false, control indicates a fault in the fuel door position sensor 124 in step 426 and control ends. In this manner, control diagnoses a fault in the fuel door position sensor 124 when the fuel door position sensor 124 indicates that the fuel door 118 is open for a period that is less than the predetermined period when a refueling event occurs. Control also diagnoses the fault when the fuel door position sensor 124 indicates that the fuel door 118 is closed for a second (i.e., longer) predetermined period when a refueling event occurs.

While FIG. 3 has been discussed as ending after step 420, 424, or 426 is performed, control may alternatively return to step 402. In other words, the steps of FIG. 3 may be illustrative of one control loop, and the fuel door sensor module 200 may implement successive control loops at a predetermined rate. For example only, the predetermined rate may be calibratable and may be set to approximately once every 100.0 ms. Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for a vehicle, comprising:
   a refueling indicator module that selectively indicates when a refueling event occurs; and
   a diagnostic module that selectively diagnoses a fault in a fuel door position sensor when said fuel door position sensor indicates that a fuel door is in one of an open position for less than a first predetermined period when said refueling event occurs and a closed position for greater than a second predetermined period when said refueling event occurs.

2. A plug-in hybrid vehicle system comprising:
   the diagnostic system of claim 1; and
   the fuel door position sensor.

3. The diagnostic system of claim 1 wherein said first predetermined period varies based on a refueling amount of said refueling event.

4. The diagnostic system of claim 1 wherein said refueling indicator module selectively indicates that said refueling event occurs when a fuel level increase is greater than a predetermined amount.

5. The diagnostic system of claim 4 wherein said refueling indicator module selectively indicates that said refueling event occurs when a tank pressure is less than a predetermined pressure after said fuel level increase.

6. The diagnostic system of claim 5 wherein said refueling indicator module indicates that said refueling event occurs when a vehicle speed is zero.

7. The diagnostic system of claim 1 wherein said refueling indicator module indicates that said refueling event occurs when a vehicle speed is zero.

8. The diagnostic system of claim 1 wherein said second predetermined period is greater than said first predetermined period.

9. A diagnostic method for a vehicle, comprising:
   selectively indicating when a refueling event occurs; and
   selectively diagnosing a fault in a fuel door position sensor when said fuel door position sensor indicates that a fuel door is in one of an open position for less than a first predetermined period when said refueling event occurs and a closed position for greater than a second predetermined period when said refueling event occurs.

10. A method comprising implementing the diagnostic method of claim 9 in a plug-in hybrid vehicle system.

11. The diagnostic method of claim 9 further comprising varying said first predetermined period based on a refueling amount of said refueling event.

12. The diagnostic method of claim 9 wherein said selectively indicating comprises selectively indicating that said refueling event occurs when a fuel level increase is greater than a predetermined amount.

13. The diagnostic method of claim 12 wherein said selectively indicating comprises selectively indicating that said refueling event occurs when a tank pressure is less than a predetermined pressure after said fuel level increase.

14. The diagnostic method of claim 13 wherein said selectively indicating comprises indicating that said refueling event occurs when a vehicle speed is zero.

15. The diagnostic method of claim 9 wherein said selectively indicating comprises indicating that said refueling event occurs when a vehicle speed is zero.

16. The diagnostic method of claim 9 wherein said second predetermined period is greater than said first predetermined period.

* * * * *